Oct. 31, 1933.    C. J. SOMMERS    1,933,455
BURNISHING MACHINE
Filed June 1, 1931

Inventor
Carl J. Sommers
by Rippey & Kingsland
His Attorneys.

Patented Oct. 31, 1933

1,933,455

UNITED STATES PATENT OFFICE 1,933,455

BURNISHING MACHINE

Carl J. Sommers, St. Louis, Mo., assignor to The Lustre Co., St. Louis, Mo., a corporation of Missouri Application June 1, 1931. Serial No. 541,389

1 Claim. (Cl. 51—164)

This invention relates to burnishing machines.

An object of the invention is to provide a burnishing machine comprising a barrel adapted and designed to contain the work and mounted on a support that is adjustable to support the barrel at different angles of inclination, in combination with improved mechanism for rotating the work barrel in any of its inclined positions in order to tumble the work about in the barrel so as to polish all of the exposed surfaces.

Another object of the invention is to provide a machine possessing the advantages and improved features of the machine herein disclosed, reference being made to the accompanying drawing, in which—

Figure 1:
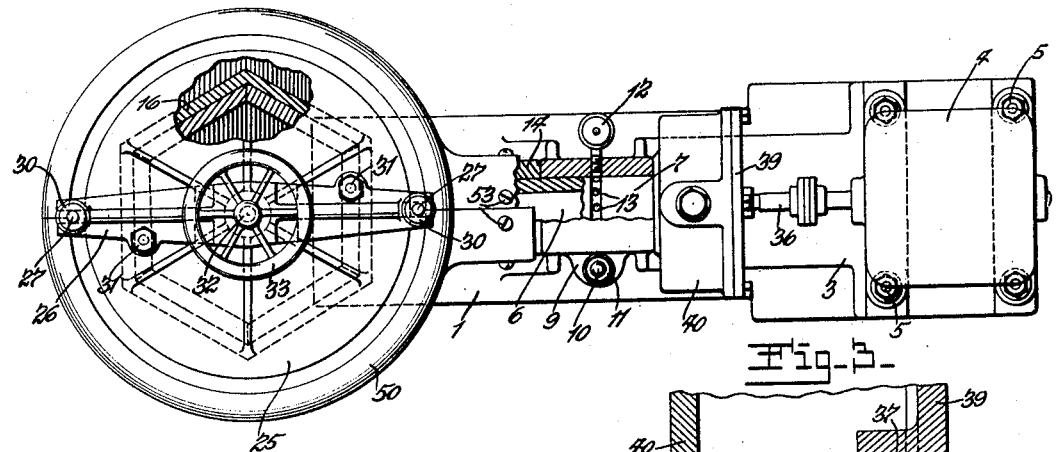
Fig. 1 is a top plan view of my improved burnishing machine, a few of the parts being shown in section.
Figure 3:
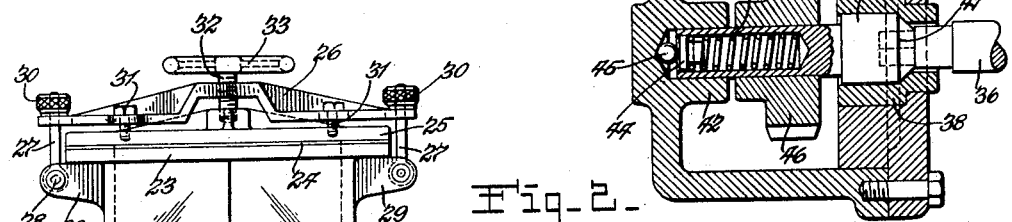
Fig. 3 is an enlarged sectional view showing the improved mounting of one of the shafts included in the operating mechanism of the machine.
Figure 2:
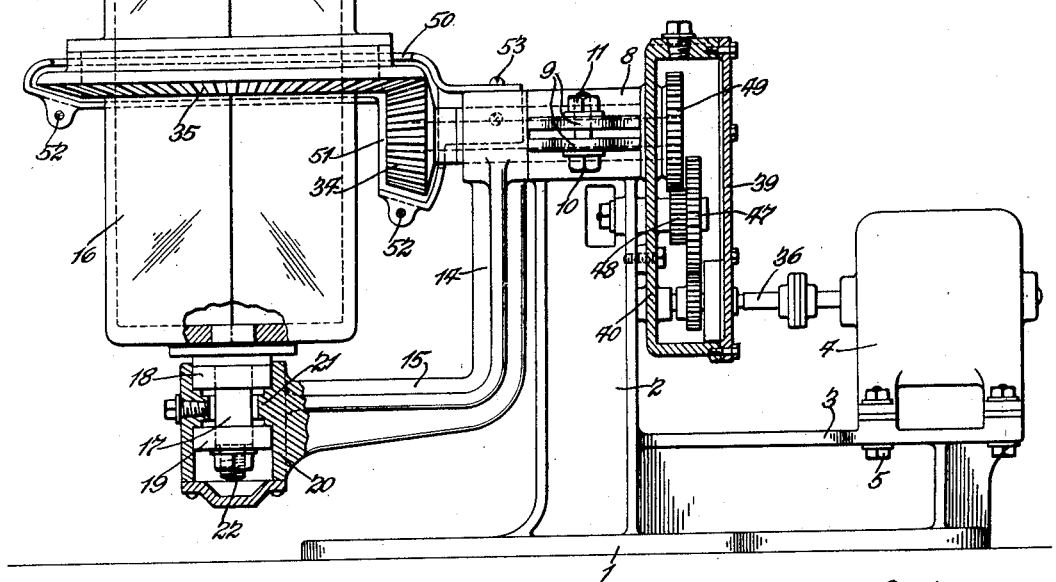
Fig. 2 is a side elevation of the machine with some of the parts in section.

This is a continuation, in part, of my prior application for patent for burnishing machine, filed November 11, 1929, Serial No. 406,494.

The improved machine shown in the accompanying drawing comprises a supporting frame including a base 1 which is seated upon a floor or foundation, and a standard 2 which supports the driven mechanism. The base 1 has a raised portion 3 to which an electric motor 4 is secured by removable fasteners 5. This supporting frame is rigid and is preferably made of metal.

A horizontal shaft 6 is journalled for rotation in a bushing sleeve 7 mounted in a split clamp bearing 8 at the upper end of the standard 2. The clamp bearing 8 has laterally extended arms 9 which are engaged by a clamping device comprising a bolt 10 and a nut 11, whereby the bearing 8 is clamped upon the sleeve bushing 7. The shaft 6 is freely rotative in the bushing. The sleeve bushing 8 does not rotate with the shaft but may be forcibly turned in the bearing 8. The shaft may be lubricated so as to facilitate the rotation thereof by any desired equipment such, for instance, as an injection grease cup 12 opening through the bearing 8 and designed and adapted to discharge lubricant to the shaft 6 through one or more holes 13 through the bushing sleeve 7.

A frame of angular shape comprising an arm 14 and a laterally extended portion 15 therefrom is attached to the bushing sleeve 7 and is operative to turn said sleeve in the bearing 8 or to turn about said sleeve, as desired. This is to say that it is immaterial whether the sleeve 7 is rotative or not.

A barrel or work receptacle 16 is supported by the angular frame 14—15 and is adjustable so as to rotate about a vertical axis or about a horizontal axis or about any inclined axis, as desired. The lower end wall of the barrel 16 is rigidly attached to an axle member 17 mounted in bearings 18 and 19 located within a bearing support 20 at the end of the frame extension 15. The bearings 18 and 19 abut against an internal flange 21 in the bearing portion 20, a nut 22 being screwed on the end of the axle member 17 to hold these bearings in proper engagement with the supporting flange 21. Thus, the barrel is freely rotative about the axis of the axle member 17. The end of the barrel opposite from the axle member 17 is open and has a circumferential flange 23 constituting a support for a packing member 24 upon which the marginal edge of the lid 25 seats.

The yoke 26 extends diametrically across the lid 25 and has notches in its ends designed and arranged to receive the swinging bolts 27 when said bolts are extended upwardly. Ends of the bolts 27 are mounted on pivots 28 carried by ears 29 projecting from opposite sides of the barrel 16 below the flange 24. These bolts 27 may be swung upwardly into the notches in the yoke 26 and are equipped with clamp nuts 30 screwed on the threaded free ends of said bolts. Thus, when the bolts are seated in the notches in the ends of the yoke 26, the clamp nuts 30 may be screwed into contact with the upper surface of said yoke. The yoke is attached to the lid 25 by screw bolts 31 projecting through holes in the yoke and having their lower ends screwed into threaded holes in said lid 25. Thus, the yoke is prevented from becoming detached from the lid.

A presser device for the lid is mounted in the yoke 26 and comprises a threaded element 32 screwed through the center of the yoke and having its lower end arranged to abut against the center of the lid. A wheel 33 constituting a handle for rotating the member 32 is screwed to the upper end of said member 32. By means of this handle 33, the member 32 may be rotated to press the lid and the packing 24 into proper engagement with the upper end of the barrel so as to obtain an hermetic joint. The ends of the yoke engaging against the nuts 30 prevent the yoke from rising and cooperate with the clamping device to clamp the lid onto the end of the barrel.

A bevel gear 34 is attached to the end of the shaft 6 and meshes with an annular bevel rack 35 rigid with the barrel 16. Thus, when the shaft 6 is rotated, the barrel will be rotated about its axis, which is in continuation of the axis of the axle member 17.

It is clear enough that the barrel may be turned to different positions of inclination, or to vertical position, or to horizontal position, and rotated in any of said positions. The frictional supporting means comprising the bushing sleeve 7 clamped within the bearing 8 and the frame 14—15 supported by said sleeve in any angular position constitute means for supporting the barrel in any of said positions.

The motor shaft 36 has detachable engagement with the end of a shaft 37. One end of the shaft 37 is journalled for rotation in a bushing 38 mounted in a plate 39 secured as a closure to the open side of a gear housing 40. The shaft 37 has a bevel shoulder 41 operating against a correspondingly shaped wall in the bushing 38 and thus forming a seal to prevent the lubricant from leaking through the bearing. In this way, lubricant may be confined in the housing so as to keep the gearing therein thoroughly lubricated.

The opposite end of the shaft 37 is mounted in a bearing 42 in the housing 40. The inner end of the shaft 37 is hollow and encloses a spring 43. One end of the spring 43 bears against an abutment in the shaft and the outer end of said spring bears against a movable abutment 44 enclosed within the shaft 37 and engaging an anti-friction bearing element 45. This construction and these devices hold the spring 43 under compression, thus utilizing the power and energy of said spring to press the shaft 37 outwardly to position to cause the shoulder 44 to operate closely against the correspondingly shaped wall of the bushing 38 and thus provide an effective seal to prevent leakage of lubricant.

A pinion 46 is attached to the shaft 37 and meshes with a gear wheel 47 rotatively supported in the housing and formed rigid with a pinion 48. The pinion 48 meshes with a gear wheel 49 rigid with the outer end of the shaft 6. Thus, when the motor is running, the barrel 16 is constantly rotated about its axis, irrespective of the angle of inclination of said barrel and irrespective of whether said barrel is supported vertically or horizontally.

The gear 34 and rack 35 are enclosed in an appropriate housing comprising two arcuate members 50 that enclose the rack 35, and integral depending housing members 51 that enclose the gear 34. These housing members are attached together by fasteners 52 and are secured to the hub of the frame member 14 by fasteners 53. Thus, these housing members are rigidly connected with each other and with the supporting frame 14—15.

A machine of this type is especially useful in the burnishing of silver and silverware because it is constructed to operate in such a manner and at such speed as to produce the desired burnishing effect without damage or injury to the work. The barrel 16 is shown provided with a wood lining 16$^a$ which contributes to this result. Accordingly, the work will not be injured irrespective of the angle of inclination of the barrel, because the barrel is of such dimensions and is rotated at such speed as to prevent damage and injury to the work, the wood lining contributing to this effect.

The operation and advantages of my improved machine are now apparent, as is the fact that the construction and arrangement of the parts may be varied within equivalent limits without departure from the nature and principle of the invention. I do not restrict myself in any unessential respects, but what I claim and desire to secure by Letters Patent is:—

A burnishing machine comprising a rigid upstanding frame, a horizontal sleeve supported by said frame, an angular support attached to said sleeve at one side of said frame, a housing device attached to said support, means for securing said sleeve in different adjustments to which said sleeve may be turned about its axis to support said support in different positions about the axis of said sleeve, a receptacle rotatively mounted on said support and extending through said housing, an annular gear rigid with said receptacle within said housing, a shaft rotative in said sleeve, a gear wheel rigid on said shaft and meshing with said annular gear, and gearing supported at the opposite side of said frame from said support for rotating said shaft.

CARL J. SOMMERS.